United States Patent
Takasaka et al.

(10) Patent No.: US 8,438,586 B2
(45) Date of Patent: May 7, 2013

(54) DRIVE DEVICE FOR OPTICAL DISC APPARATUS

(75) Inventors: Daisuke Takasaka, Osaka (JP); Tetsuya Tamura, Osaka (JP); Masaki Nakatani, Osaka (JP); Katsuo Ichinohe, Osaka (JP); Riklya Ueshima, Osaka (JP); Tomohiro Kobayashi, Osaka (JP); Yoshiyuki Nakagawa, Osaka (JP); Yasuhide Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/366,601

(22) Filed: Feb. 6, 2012

(65) Prior Publication Data

US 2012/0204195 A1 Aug. 9, 2012

(30) Foreign Application Priority Data

Feb. 7, 2011 (JP) ................................ 2011-024477

(51) Int. Cl.
*G11B 7/085* (2006.01)
(52) U.S. Cl.
USPC ........................................................ 720/672
(58) Field of Classification Search ................... 720/672
See application file for complete search history.

(56) References Cited

U.S. PATENT DOCUMENTS

| 6,445,674 | B1 * | 9/2002 | Morita | 720/671 |
| 6,807,670 | B2 * | 10/2004 | Ohtsuka | 720/672 |
| 6,813,772 | B2 * | 11/2004 | Ariyoshi | 720/600 |
| 7,103,895 | B2 * | 9/2006 | Osada et al. | 720/671 |
| 2004/0255316 | A1 * | 12/2004 | Ryu | 720/672 |
| 2011/0239238 | A1 * | 9/2011 | Yoon et al. | 720/671 |

FOREIGN PATENT DOCUMENTS

| JP | 11-224469 | 8/1999 |
| JP | 2005-216344 | 8/2005 |
| JP | 2008-257826 | 10/2008 |

* cited by examiner

*Primary Examiner* — Mark Blouin
(74) *Attorney, Agent, or Firm* — Morgan, Lewis & Bockius LLP

(57) ABSTRACT

A drive device for an optical disc apparatus, wherein the tooth comprises a tooth body fixed to an optical pickup, two support pieces projecting from the tooth body toward a lead screw, two resin spring pieces provided with a base part on the projecting end of each of the support pieces and extending in a direction orthogonal to the axial direction of the lead screw, a plate part having a base part on the extending ends of the resin spring pieces and formed in a direction parallel to the axial direction of the lead screw, meshing cogs formed on the plate part on the side near the lead screw, and a linking part formed across the space between the resin spring pieces.

3 Claims, 36 Drawing Sheets

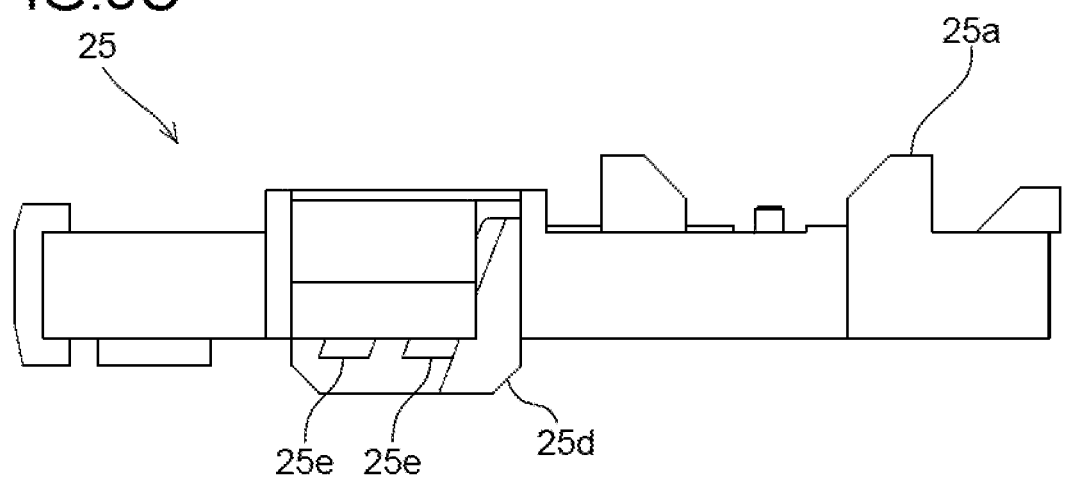

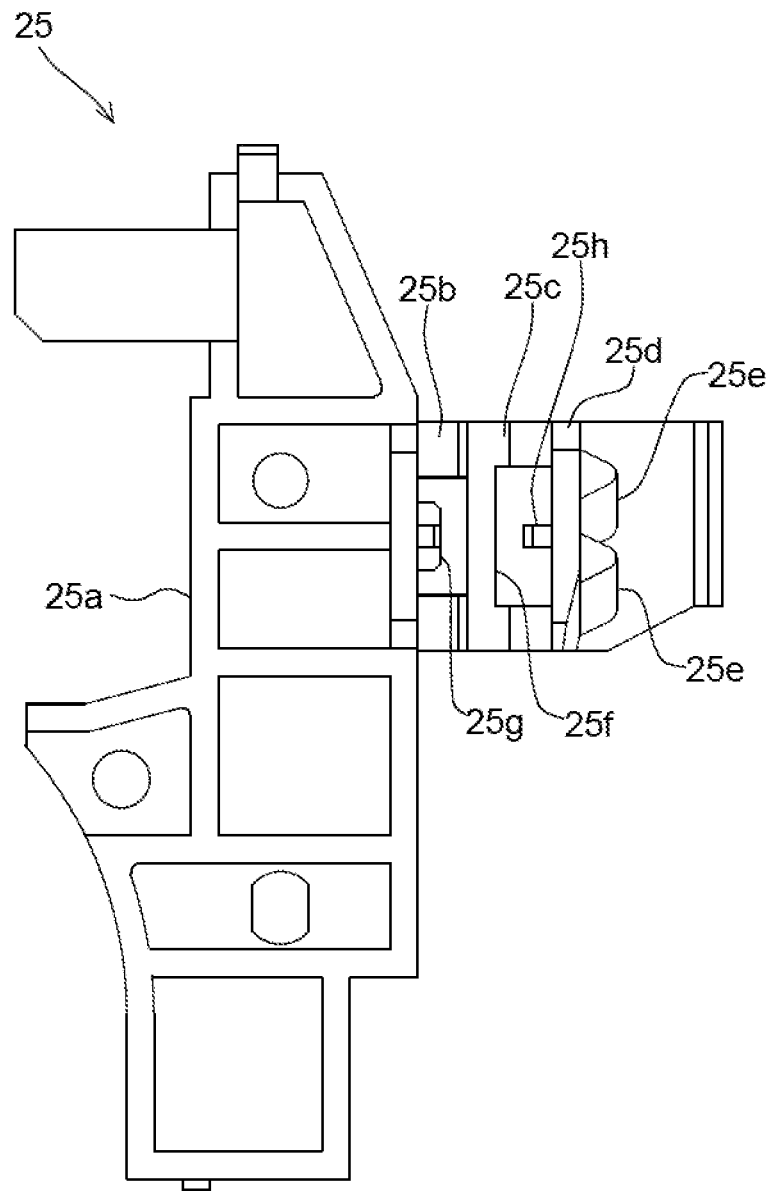

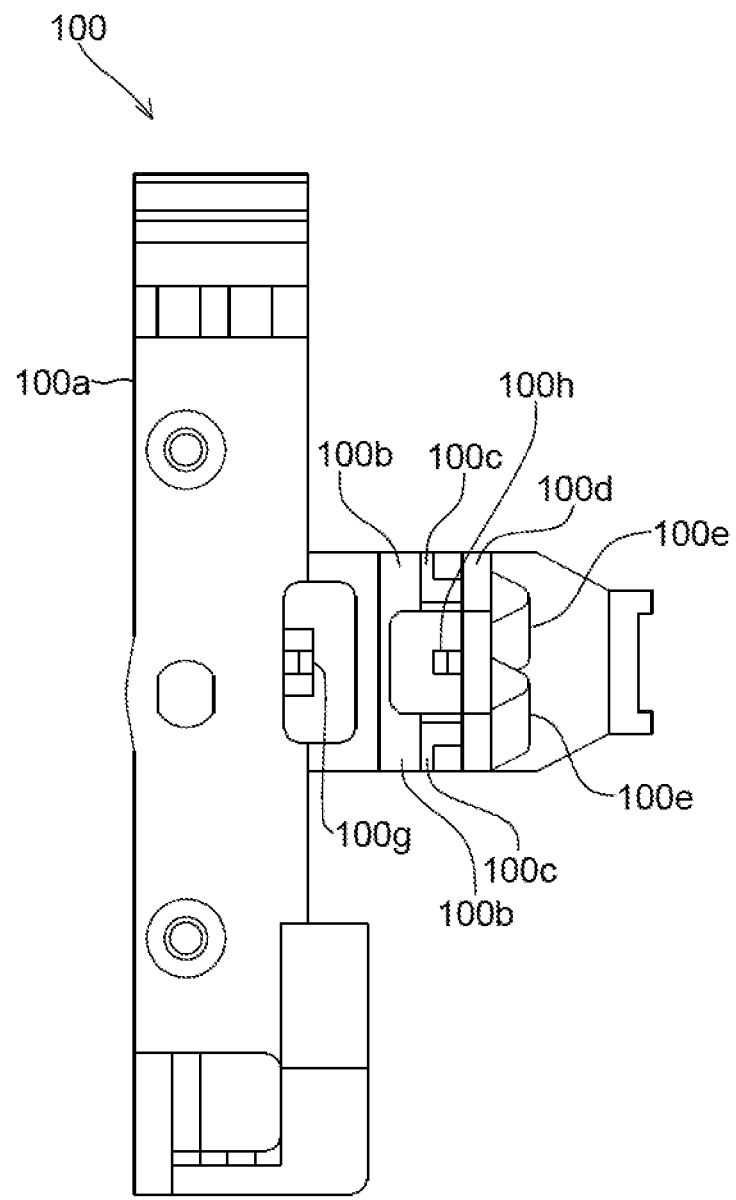

DRIVE DEVICE FOR OPTICAL DISC APPARATUS

This application is based on Japanese Patent Application No. 2011-024477 filed on Feb. 7, 2011, the contents of which are hereby incorporated by reference.

BACKGROUND OF THE INVENTION

1. Field of the Invention

The present invention relates to a drive device for an optical disc apparatus for recording on or playing a CD, DVD, BD (Blu-ray Disc), or other optical disc.

2. Description of Related Art

Optical pickup feeding devices provided in drive devices for general optical disc apparatuses comprise a lead screw and a resin tooth that is advanced following the rotation of the lead screw while being in meshed engagement with the lead screw. The tooth is further attached to an optical pickup that can move along a guide shaft, is extended in a cantilevered state in a direction orthogonal to the axis line of the lead screw, and is provided with a tooth spring for elastically urging the tooth from a back part and urging meshing cogs thereof in the direction of meshing with the lead screw. Various improvements to the mechanisms of such optical disc apparatuses have also been proposed in recent years.

For example, there is disclosed in Japanese Laid-open Patent Publication No. 2008-257826 a configuration of a feeding apparatus for an optical pickup comprising a lead screw and a resin toothed body that is advanced following the rotation of the lead screw while being in meshed engagement with the lead screw, the toothed body being attached to an optical pickup that can move along a guide axis adjusted at a slant, extended in a cantilevered state in a direction orthogonal to the axis line of the lead screw, and provided with a spring body for elastically urging the toothed body from a back part and urging meshing cogs thereof in a direction of meshing with the lead screw; wherein the position of urging the toothed body by the spring body in relation to the position of meshing between the meshing cogs of the toothed body and the lead screw is offset toward the free end of the toothed body and away from the meshing position.

There is disclosed in Japanese Laid-open Patent Publication No. 2005-216344 a configuration of a rack for an optical pickup module provided with a rack body and a contact part for contacting a lead screw shaft, and used so that an optical pickup for irradiating an optical disc with laser light and recording and replaying information moves in the radial direction of the optical disc; wherein the contact part and the rack body are disposed facing each other with an elastic member provided therebetween, and a substantial parity is achieved between the deformed shape of the elastic member when an upward external force is applied to the contact part and the deformed shape of the elastic member when a downward external force is applied.

There is disclosed in Japanese Laid-open Patent Publication No. 11-224469 a configuration of an information recording apparatus comprising holding means for holding an information recording medium; readout means for reading out or reading/writing information on the information recording medium; guiding means for holding the readout means (or the holding means) while allowing the readout means to slide parallel to the information recording medium; feeding means for moving the position of the readout means (or the holding means) in a sliding direction to vary the position at which the information on the information recording medium is read out, or to vary the position at which the information is read/written; and a chassis for supporting the holding means (or the readout means), the guiding means, and the feeding means; wherein the feeding means comprises a lead screw formed having a spiral groove on a cylindrical surface and disposed parallel to the guiding means, driving means for rotatably driving the lead screw, and transmitting means provided to the readout means (or the holding means), engaged with the spiral groove, and adapted to transmit driving power from the lead screw to the readout means (or the holding means); the transmitting means comprises a cog part that slidably engages with the spiral groove on the lead screw on the side near the guiding means, an attachment fixed to the readout means (or the holding means), and engaging means constructed of a hinge part connected to the attachment so as to allow the cog part to be engaged with and disengaged from the spiral groove; and the toothed part comes into contact with any of the guiding means, the readout means (or the holding means), the attachment, or the chassis to restrict the amount of displacement of the cog part before the engagement between the cog part and the spiral groove is released when the cog part is displaced in the direction of disengagement from the spiral groove.

It is apparent that thinner teeth will be required when an attempt is made to make thinner drive devices in order to respond to the current demand for smaller optical disc apparatuses. However, a decrease in tooth thickness is not discussed in the aforementioned three cited references. A problem therefore arises in that simply reducing the thickness of a conventional tooth will fail to meet the design requirements. Examples of the design requirements include preventing the tooth from breaking due to stress applied to the tooth when the tooth spring is inserted during assembly, ensuring adequate displacement of the tooth when the tooth is urged toward the lead screw, and preventing the tooth from breaking when tooth jumping occurs.

SUMMARY OF THE INVENTION

An object of the present invention is to provide a thin drive device for an optical disc apparatus by ensuring the strength required by the design is attained when the tooth is made thinner.

In order to achieve the aforementioned object, the present invention provides a drive device for an optical disc apparatus comprising: an optical pickup; a guide shaft for movably supporting the optical pickup; a lead screw; a resin tooth fixed to the optical pickup, the tooth extending toward the lead screw in a cantilevered state, meshing cogs thereof being in meshed engagement with the lead screw, and the tooth being advanced following the rotation of the lead screw; and a tooth spring for urging the meshing cogs in the direction of meshing with the lead screw; wherein the tooth comprises a tooth body fixed to the optical pickup, a plurality of support pieces projecting from the tooth body toward the lead screw, a plurality of resin spring pieces having a base part on the projecting end of each of the support pieces and extending in a direction orthogonal to the axial direction of the lead screw, a plate part provided with a base part on the extending ends of the resin spring pieces and formed in a direction parallel to the axial direction of the lead screw, meshing cogs formed on the plate part on the side near the lead screw, and a linking part formed across the space between the support pieces and/or the resin spring pieces; and wherein the tooth spring is disposed so as to urge the tooth body and the plate part in a space between the resin spring pieces.

In the drive device of an optical disc apparatus, two resin spring pieces are preferably provided, and the linking part preferably links the base parts of the resin spring pieces on the side near the support pieces.

In the drive device of an optical disc apparatus, the linking part preferably has the same thickness as the resin spring pieces.

According to the present invention, a linking part is provided to the tooth, whereby the strength required by the design can be ensured when the tooth is made thinner, making it possible to implement a thin drive device for an optical disc apparatus.

BRIEF DESCRIPTION OF THE DRAWINGS

FIG. 5C is a left-side view of a tooth according to the present invention;

FIG. 5F is a bottom view of a tooth according to the present invention;

FIG. 6A is a plan view of a tooth according to a comparative example;

DETAILED DESCRIPTION OF PREFERRED EMBODIMENTS

Figure 1A:
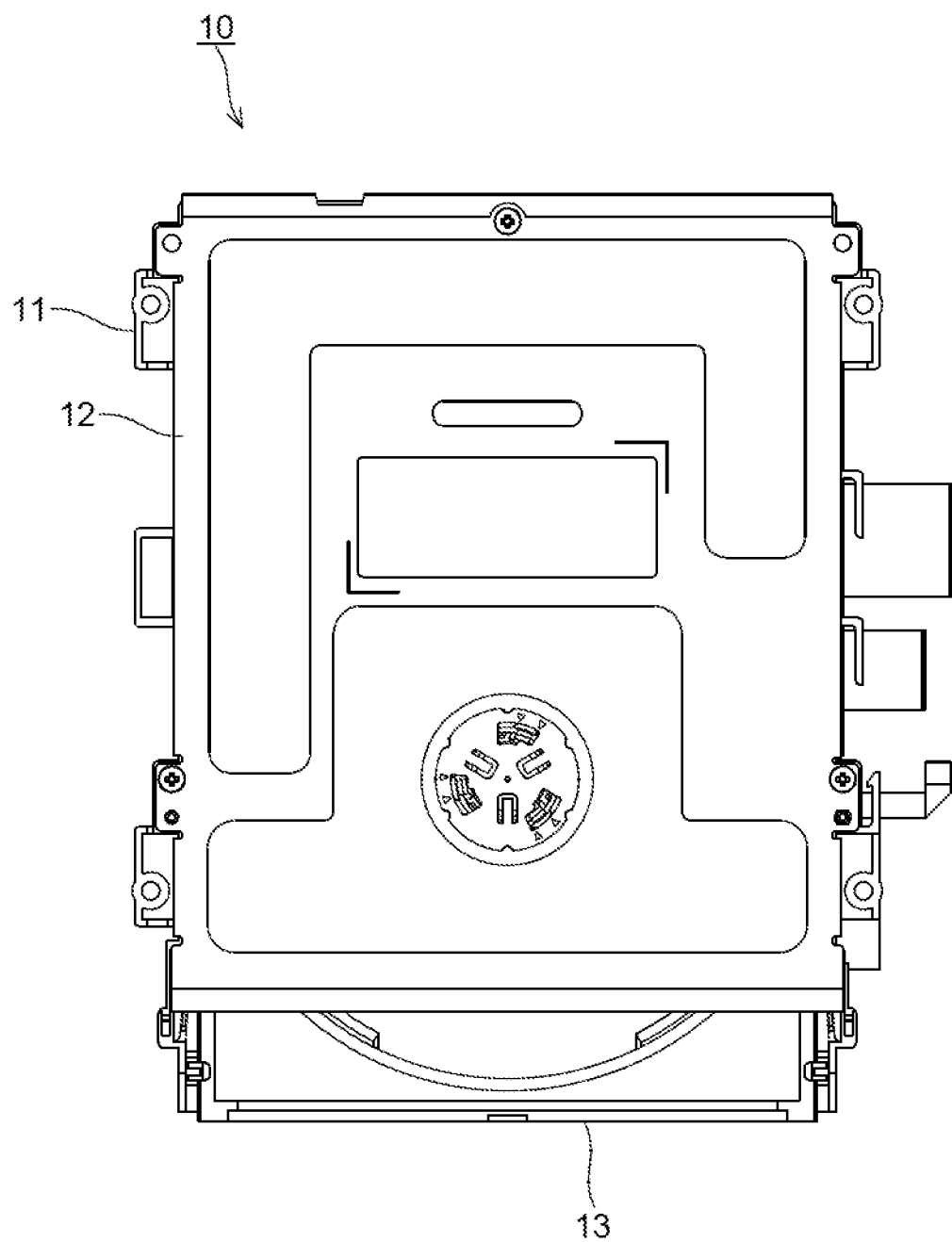
FIG. 1A is a plan view of a drive device for an optical disc apparatus according to the present invention.
Figure 1B:
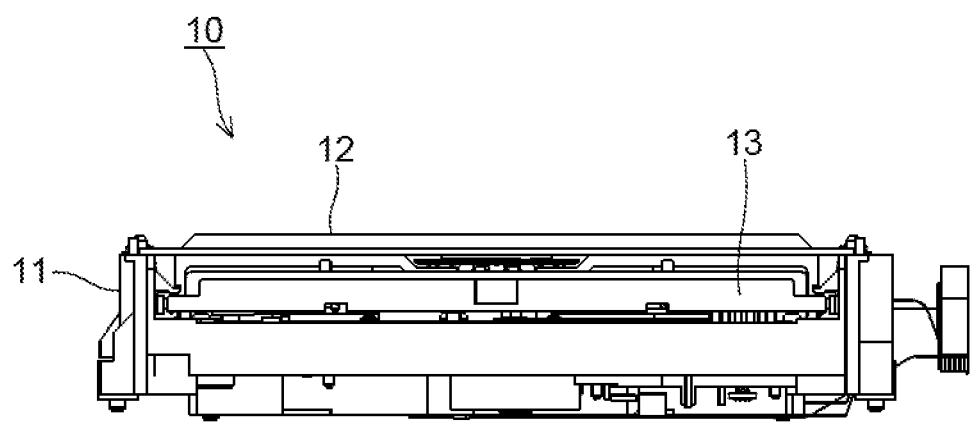
FIG. 1B is a front view of the drive device for an optical disc apparatus according to the present invention.
Figure 1C:
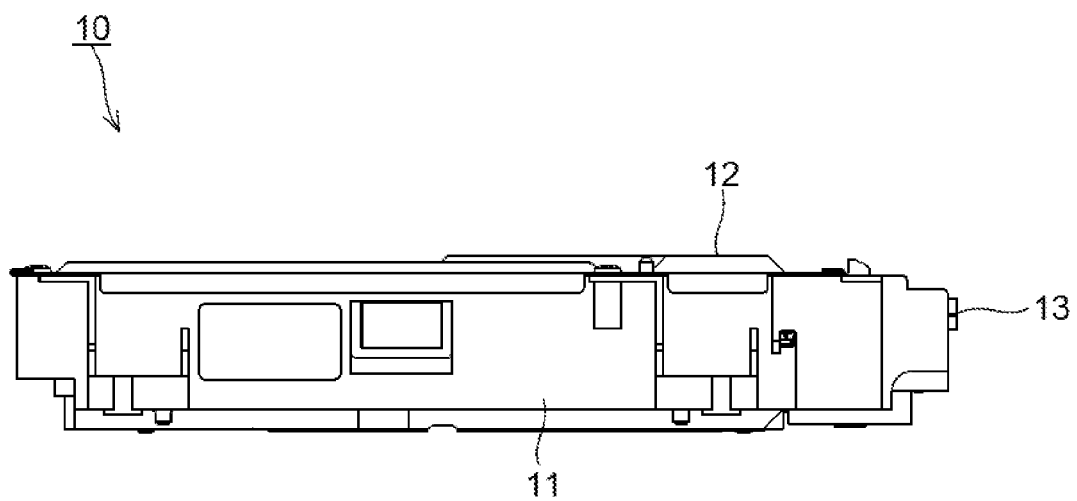
FIG. 1C is a left-side view of the drive device for an optical disc apparatus according to the present invention.
Figure 1D:
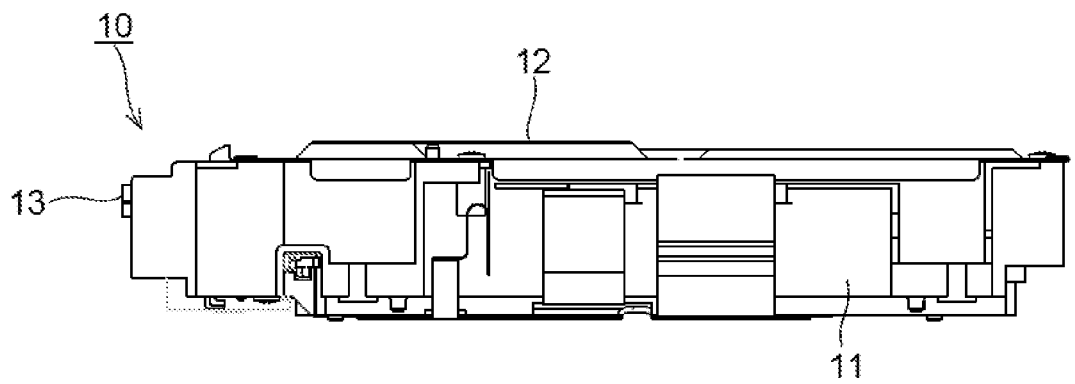
FIG. 1D is a right-side view of the drive device for an optical disc apparatus according to the present invention.
Figure 1E:
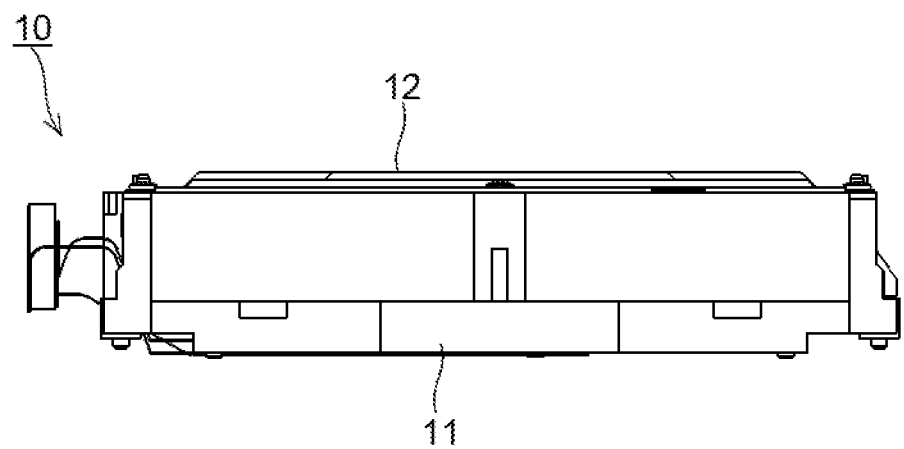
FIG. 1E is a back view of the drive device for an optical disc apparatus according to the present invention.
Figure 1F:
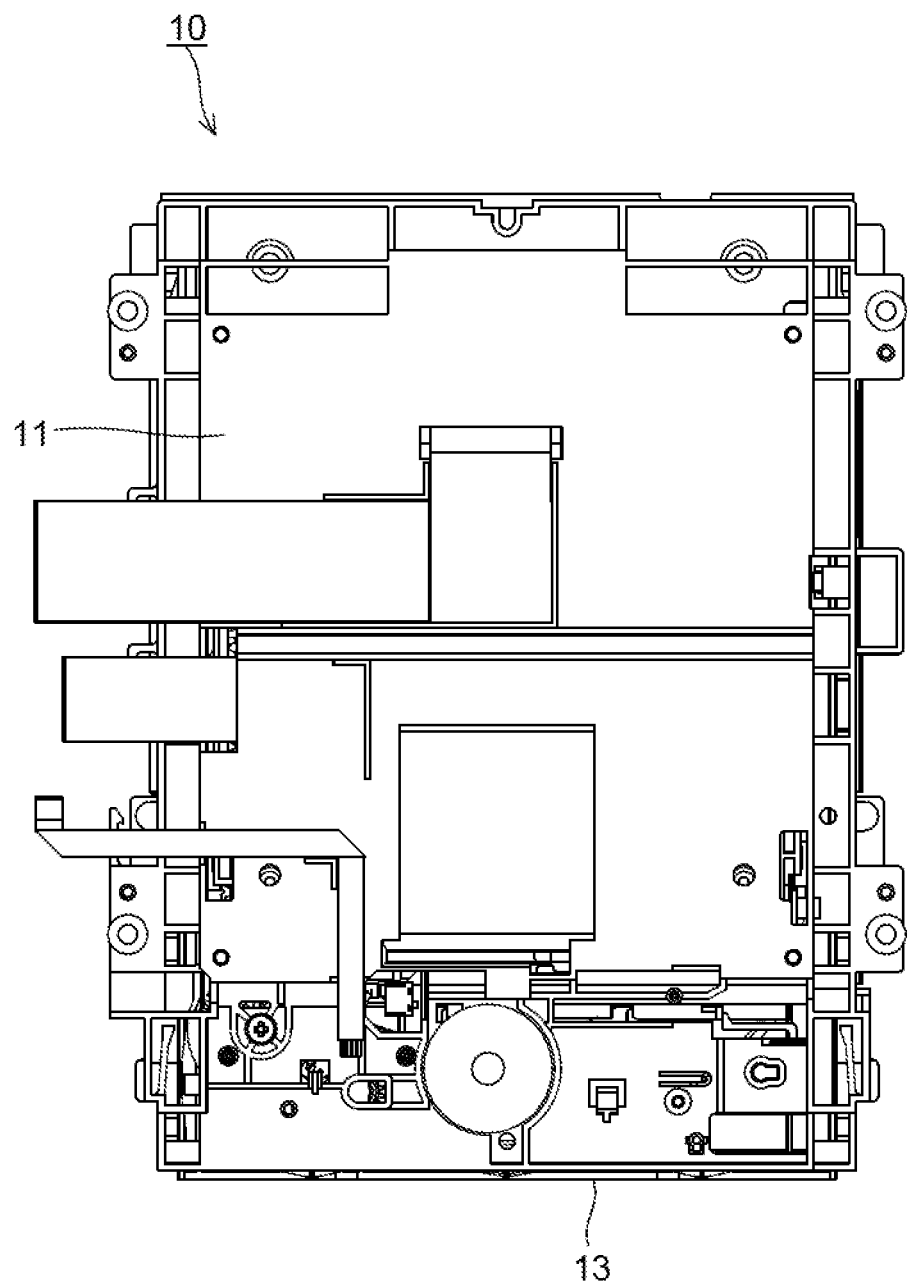
FIG. 1F is a bottom view of the drive device for an optical disc apparatus according to the present invention.
Figure 2A:
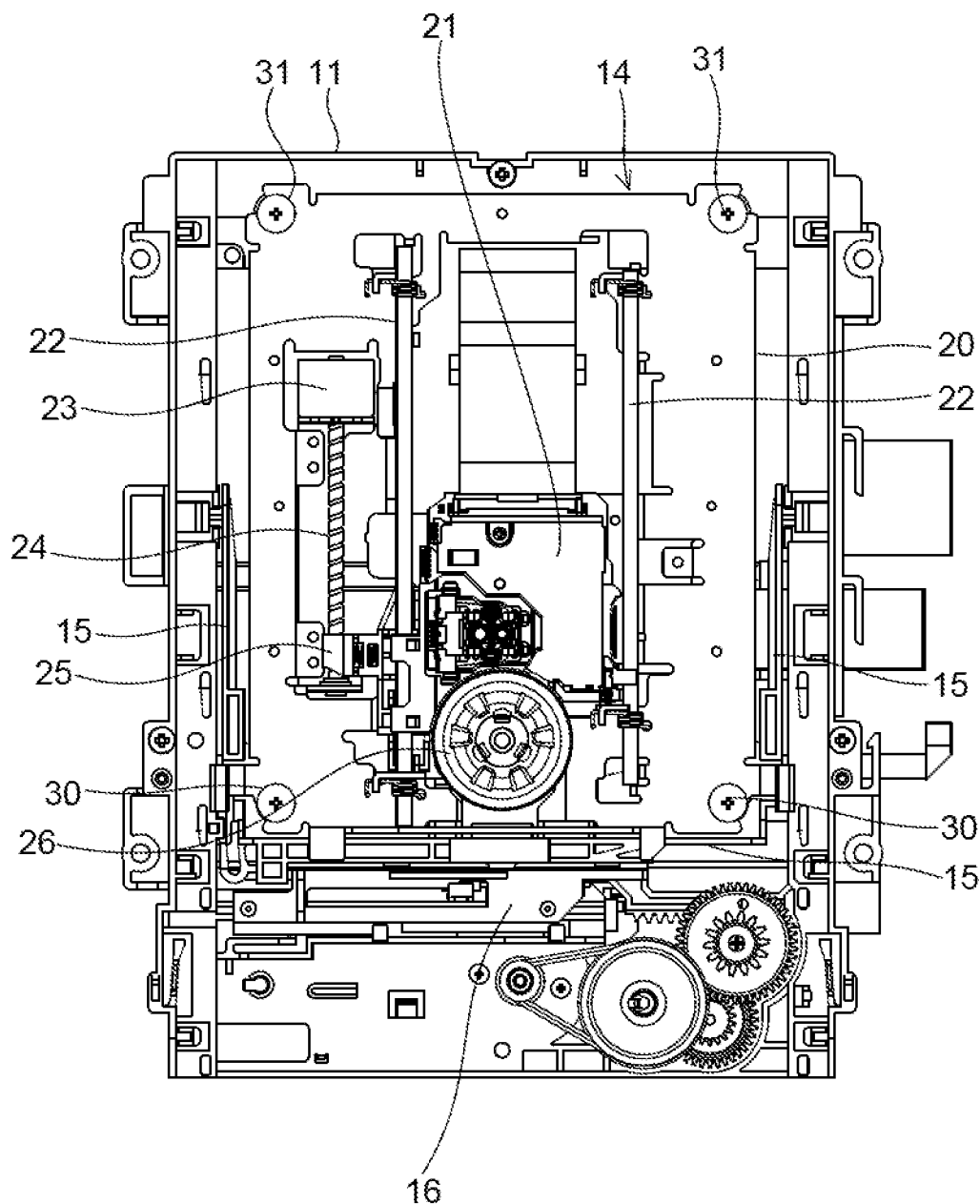
FIG. 2A is a view of FIG. 1A, with the cover and disc tray removed.
Figure 2B:
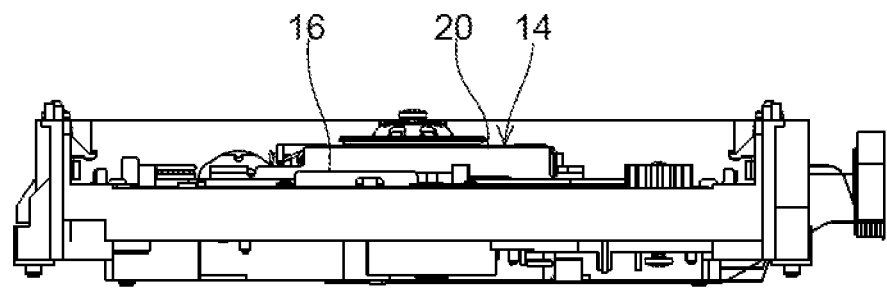
FIG. 2B is a view of FIG. 1B, with the cover and disc tray removed.
Figure 2C:
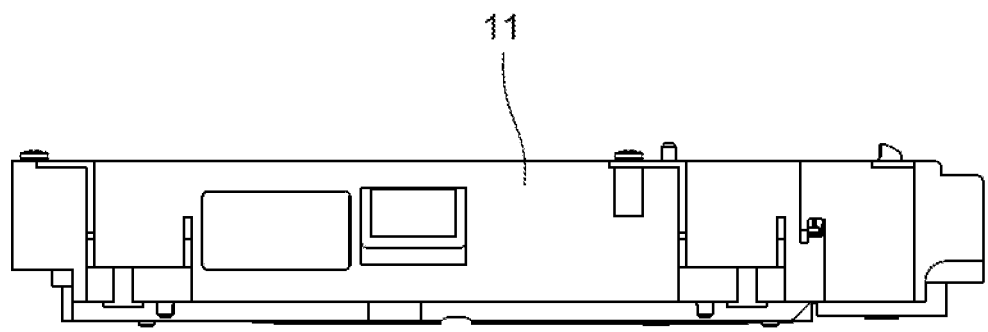
FIG. 2C is a view of FIG. 1C, with the cover and disc tray removed.
Figure 2D:
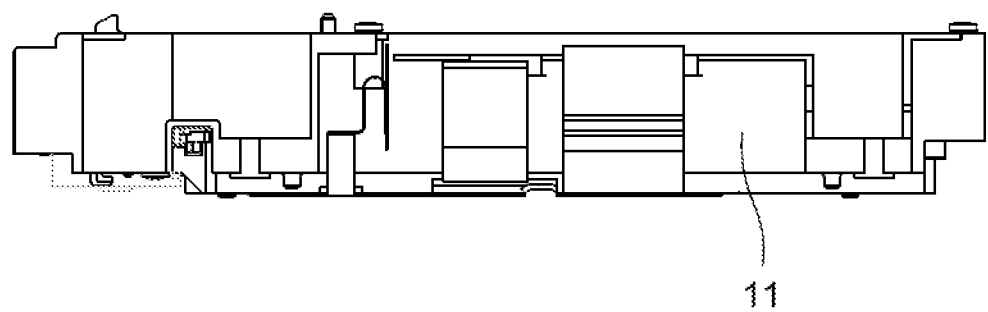
FIG. 2D is a view of FIG. 1D, with the cover and disc tray removed.
Figure 2E:
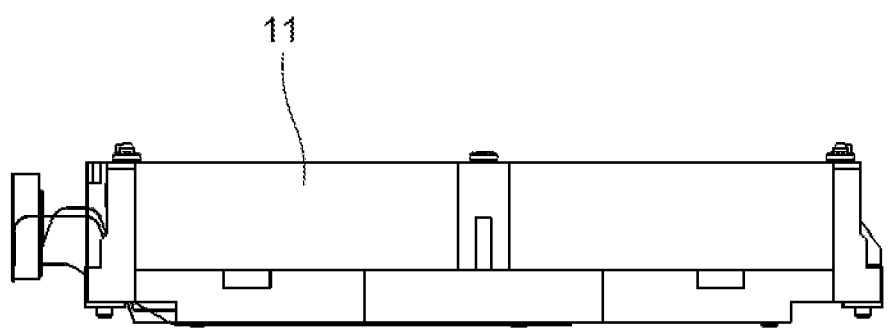
FIG. 2E is a view of FIG. 1E, with the cover and disc tray removed.
Figure 2F:
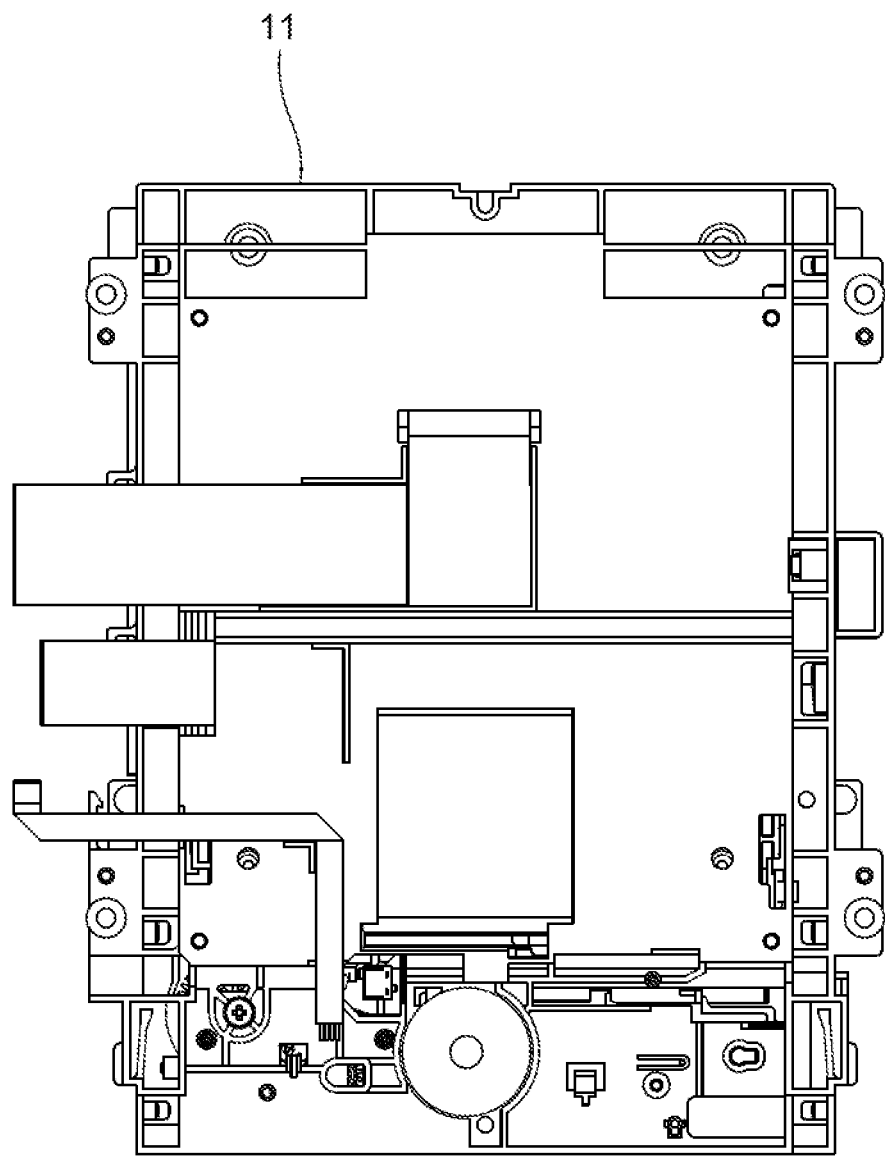
FIG. 2F is a view of FIG. 1F, with the cover and disc tray removed.
Figure 3A:
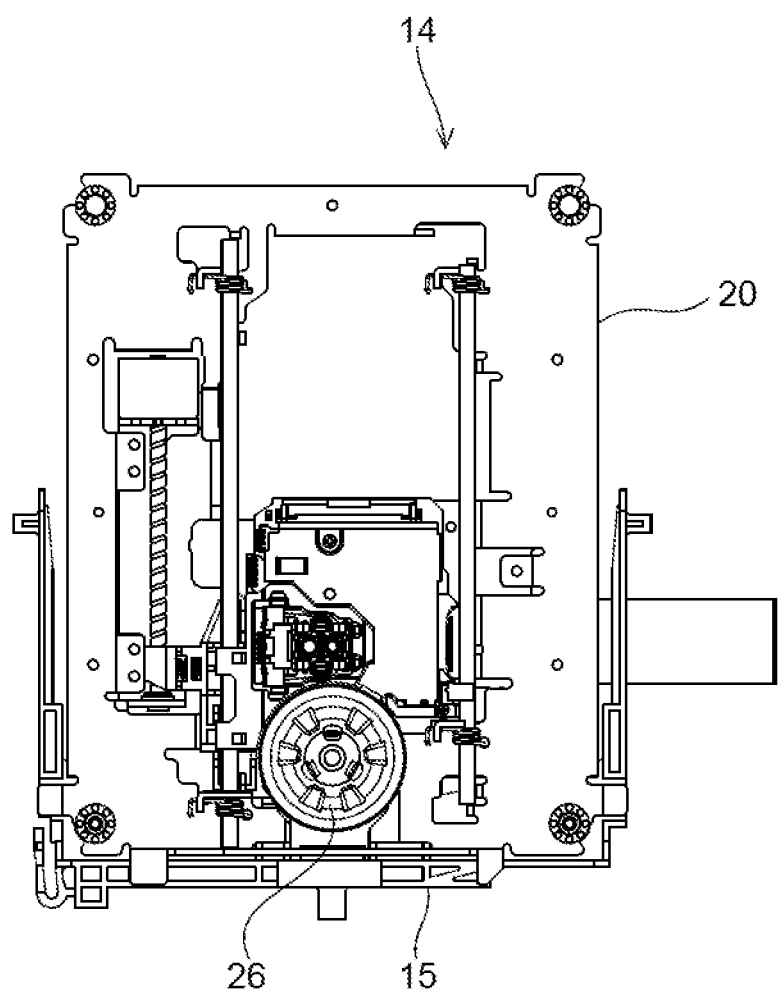
FIG. 3A is a plan view of the traverse assembly and the lever arm according to the present invention.
Figure 3B:
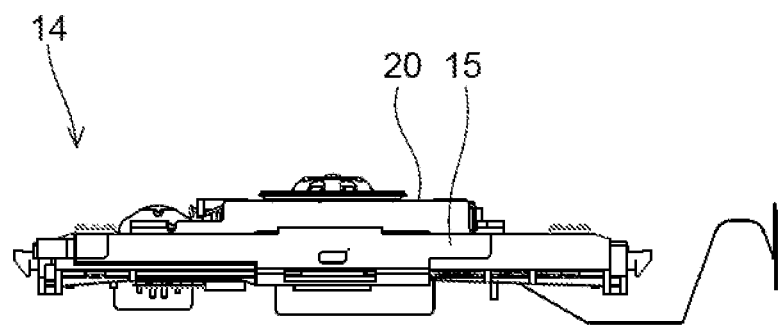
FIG. 3B is a front view of the traverse assembly and the lever arm according to the present invention.
Figure 3C:
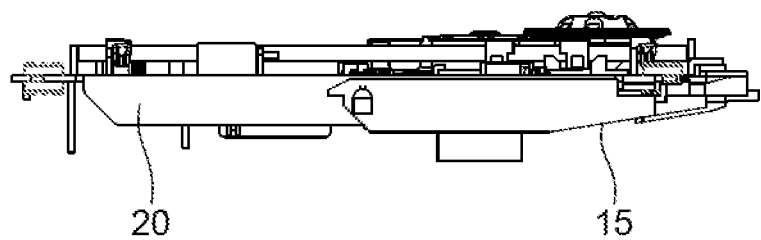
FIG. 3C is a left-side view of the traverse assembly and the lever arm according to the present invention.
Figure 3D:
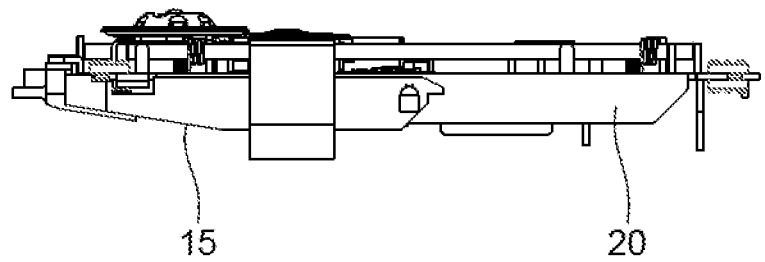
FIG. 3D is a right-side view of the traverse assembly and the lever arm according to the present invention.
Figure 3E:
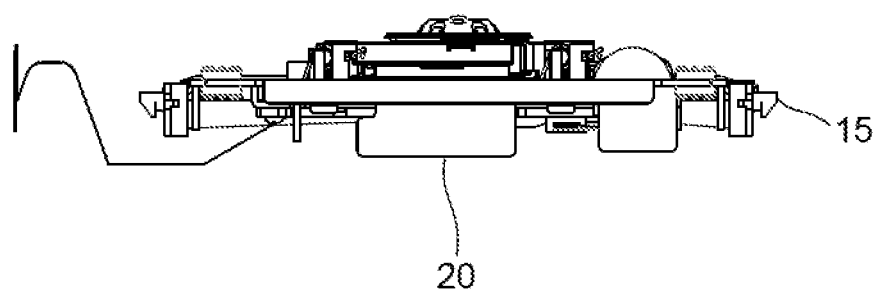
FIG. 3E is a back view of the traverse assembly and the lever arm according to the present invention.
Figure 3F:
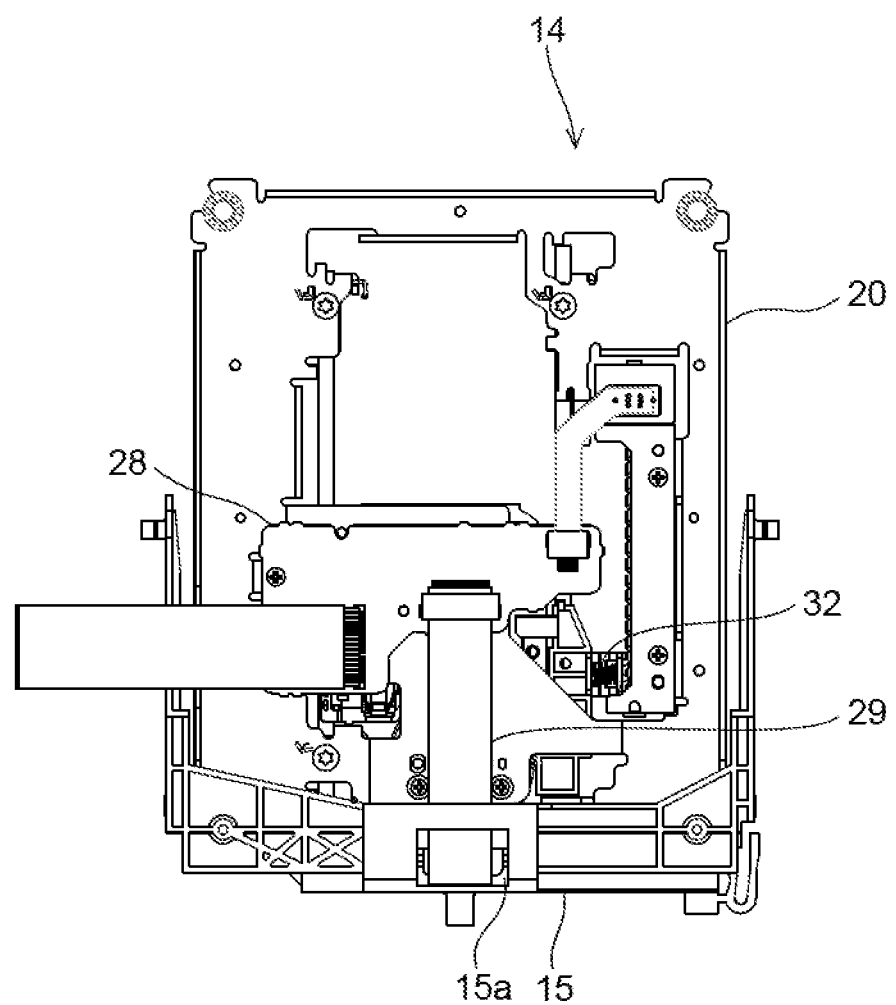
FIG. 3F is a bottom view of the traverse assembly and the lever arm according to the present invention.
Figure 4A:
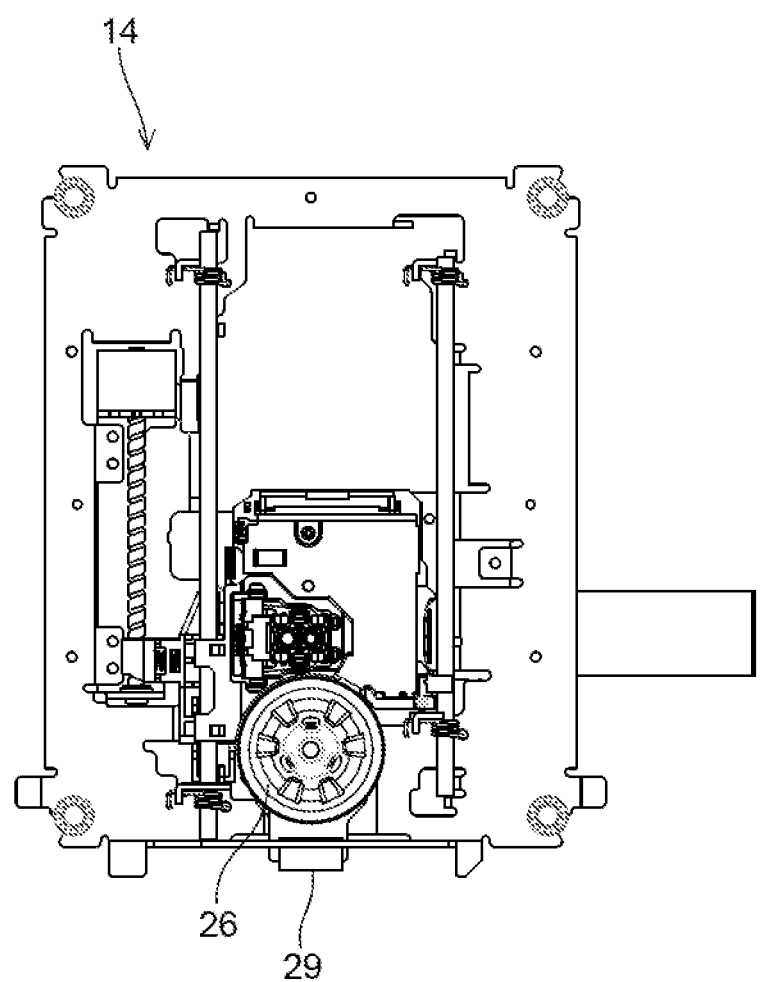
FIG. 4A is a plan view of the traverse assembly according to the present invention.
Figure 4B:
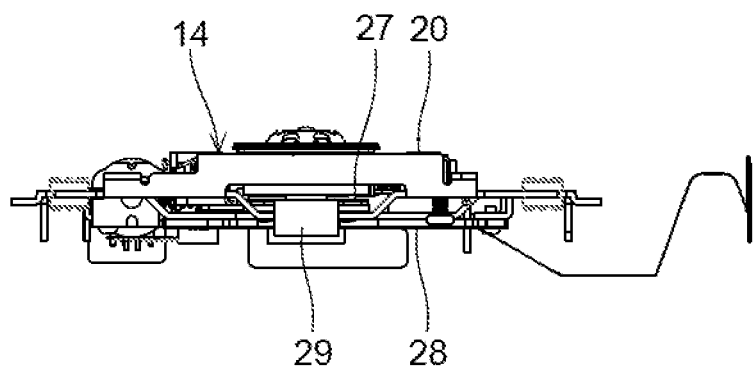
FIG. 4B is a front view of the traverse assembly according to the present invention.
Figure 4C:
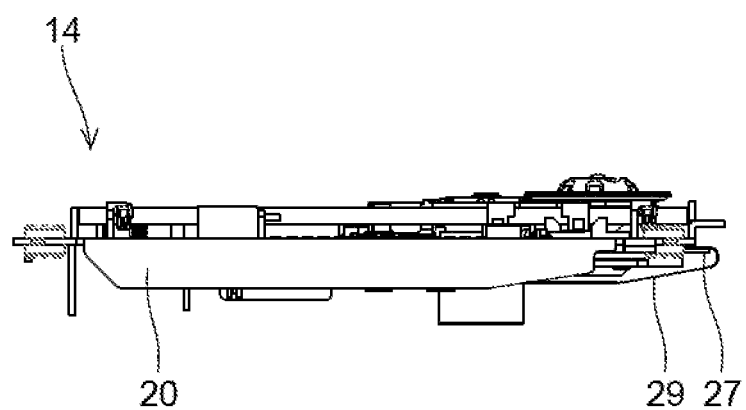
FIG. 4C is a left-side view of the traverse assembly according to the present invention.
Figure 4D:
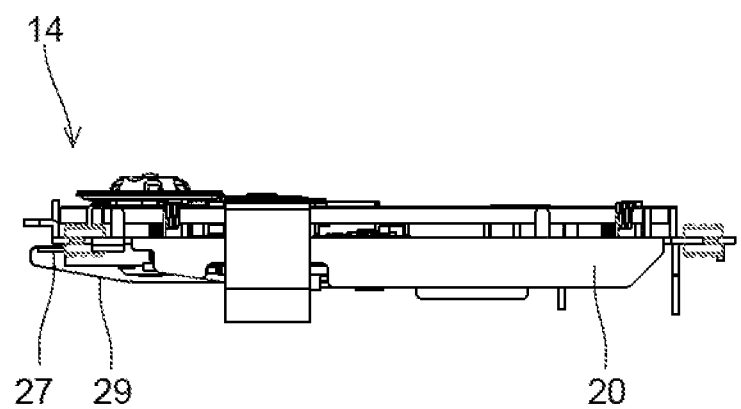
FIG. 4D is a right-side view of the traverse assembly according to the present invention.
Figure 4E:
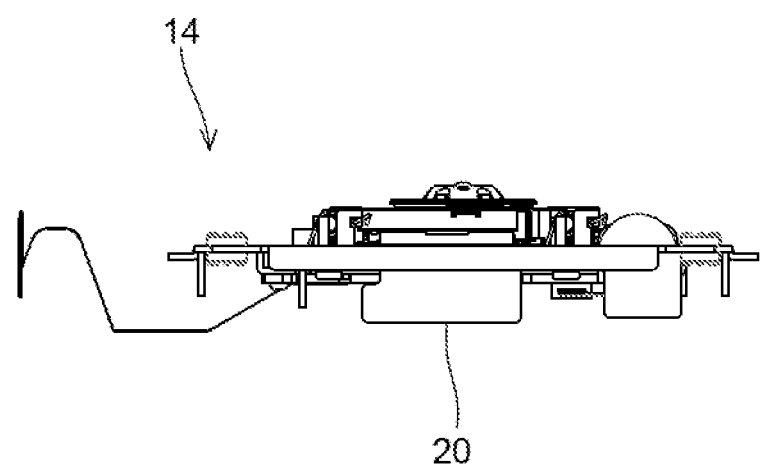
FIG. 4E is a back view of the traverse assembly according to the present invention.
Figure 4F:
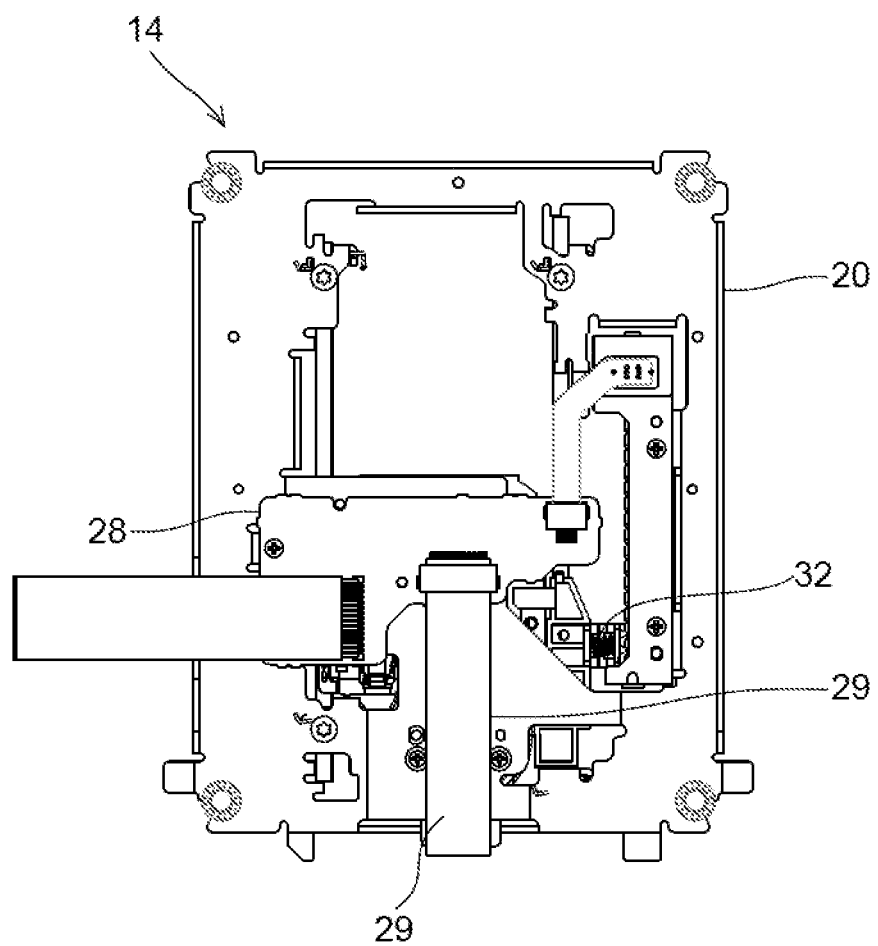
FIG. 4F is a bottom view of the traverse assembly according to the present invention.

FIGS. 1A to 1F are six views of a drive device for an optical disc apparatus according to the present invention, where FIG. 1A is a plan view, FIG. 1B is a front view, FIG. 1C is a left-side view, FIG. 1D is a right-side view, FIG. 1E is a back view, and FIG. 1F is a bottom view. FIGS. 2A to 2F are views of FIGS. 1A to 1F, respectively, with the upper cover and disc tray removed. In addition, FIGS. 3A to 3F are six views of the traverse assembly 14 and the lever arm 15, where FIG. 3A is a plan view, FIG. 3B is a front view, FIG. 3C is a left-side view, FIG. 3D is a right-side view, FIG. 3E is a back view, and FIG. 3F is a bottom view. FIGS. 4A to 4F are six views of the traverse assembly 14, where FIG. 4A is a plan view, FIG. 4B is a front view, FIG. 4C is a left-side view, FIG. 4D is a right-side view, FIG. 4E is a back view, and FIG. 4F is a bottom view.

A drive device 10 is accommodated in the housing of an apparatus body that forms the exterior of an optical disc apparatus. The drive device 10 comprises a loader chassis 11 for accommodating the members of the drive device 10, a cover 12 for covering the upper-surface opening of the loader chassis 11, a disc tray 13 for conveying an optical disc, a traverse assembly 14 capable of rotating and moving up and down in a direction substantially perpendicular (vertical direction) to the conveying direction (forward/backward direction) of the disc tray 13, a vertically moving lever arm 15 having a substantially U-shape in plan view and covering part (near the front end of the lower surface in the present embodiment) of the lower surface of the traverse assembly 14 as well as supporting the traverse assembly 14, a cam slider 16 for engaging as a cam with the front part of the lever arm 15 and moving in a left-right direction (direction substantially orthogonal to the conveying direction of the disc tray 13 and the up/downwardly moving direction of the traverse assembly 14) to vertically move the lever arm 15, and a motor (not shown) for driving the disc tray 13 and the cam slider 16 via a plurality of gears.

The traverse assembly 14 comprises a traverse chassis 20 for mounting the members; an optical pickup unit (OPU) 21; two guide shafts 22, 22 for supporting the OPU 21 while allowing movement in the radial direction (forward/backward direction) of the optical disc; a stepper motor 23 for driving the OPU 21; a lead screw 24 connected to the stepper motor 23; a resin tooth 25 fixed to the OPU 21, the tooth extending toward the lead screw 24 in a cantilevered state, the meshing cogs thereof being in meshed engagement with the lead screw 24, and the tooth being advanced following the rotation of the lead screw 24; a tooth spring 32 for urging the meshing cogs in the direction of meshing with the lead screw 24 (refer to FIG. 3F); a spindle motor 26 provided to the section near the front of the upper surface of the traverse chassis 20 and used for rotating the optical disc; a spindle motor PCB (printed board) 27 on which the spindle motor 26 is mounted (refer to FIG. 4B); a PCB 28 provided to the lower surface of the traverse chassis 20 and used for controlling the entire drive device 10 (refer to FIG. 4F); and a spindle motor FFC (flexible flat cable) 29 connected by one end to the spindle motor PCB 27, extended from the front of the traverse chassis 20 around the underside of the traverse chassis 20, passed between the traverse chassis 20 and the lever arm 15, and connected by the other end to the PCB 28 (refer to FIG. 4A).

The traverse assembly 14 is locked to the lever arm 15 by locking parts 30, 30 at two points on the front end of the traverse chassis 20, and is locked to the loader chassis 11 by locking parts 31, 31 at two points on the back end of the traverse chassis 20. The locking parts 30, 31 are rubber O-rings and screws.

In the optical disc apparatus configured as described above, the disc tray 13 is conveyed in the disc device 10 by the driving of the motor when an optical disc is placed on the disc tray 13 in a pulled-out state. When the disc tray 13 is disposed at a specified position, transmission of the driving power of the motor to the disc tray 13 is canceled to stop the disc tray 13, the cam slider 16 is moved by the driving of the motor, and the traverse assembly 14 is raised. The traverse assembly 14 is thereby engaged with the optical disc, and the optical disc is chucked.

Transmission of the driving power of the motor to the cam slider 16 is cancelled and the cam slider 16 and the traverse assembly 14 are stopped when the optical disc is chucked. The OPU 21 is then moved to a specified position by the driving of the stepper motor 23, and the optical disc is recorded on or played. In addition, an operation opposite to that described above is performed when the optical disc is removed.

Figure 5A:
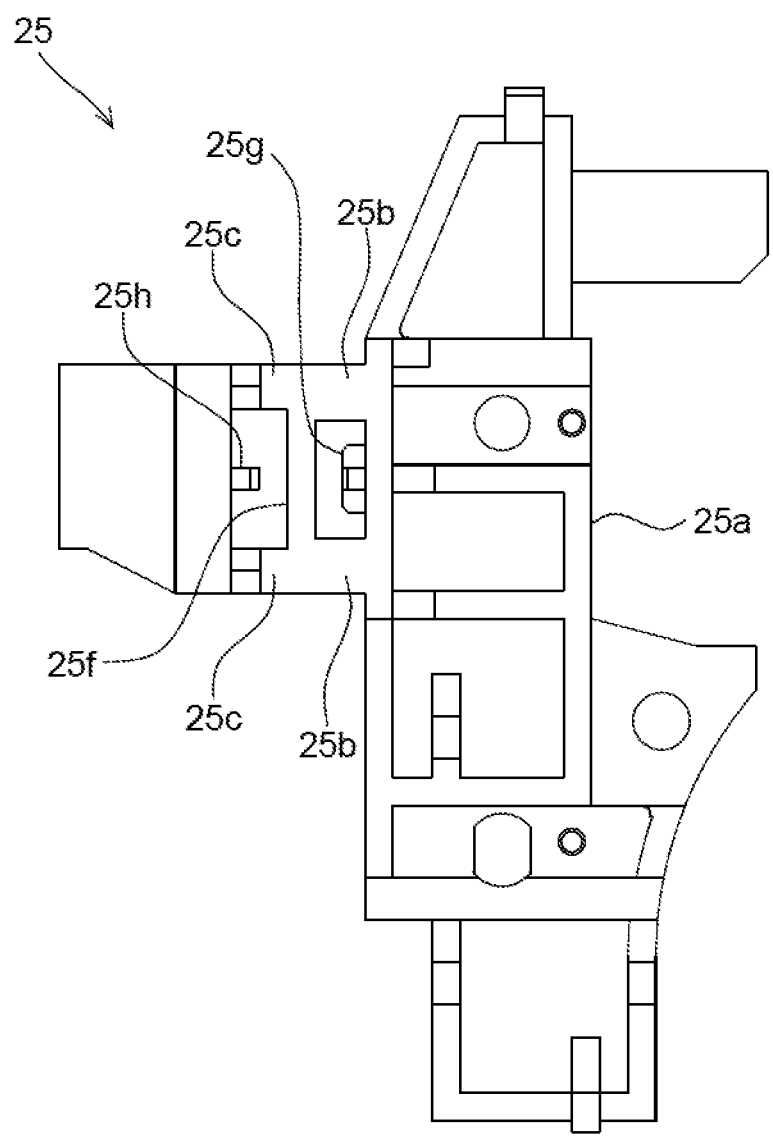
FIG. 5A is a plan view of a tooth according to the present invention.
Figure 5B:
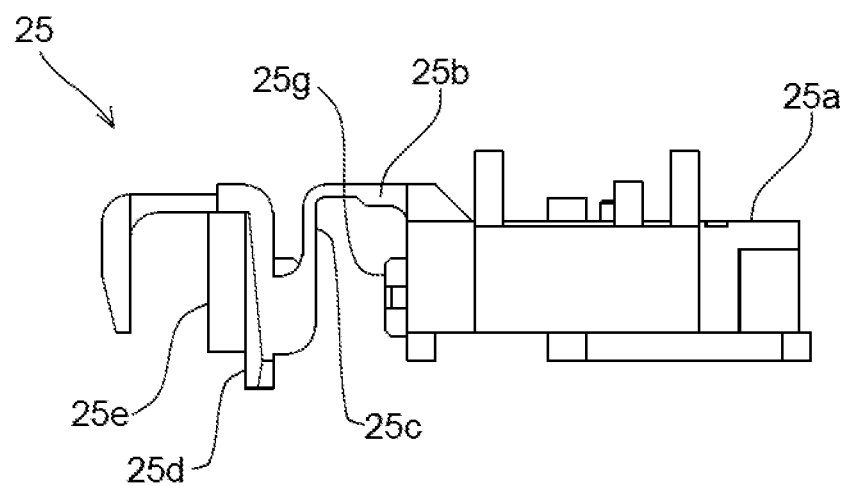
FIG. 5B is a front view of a tooth according to the present invention.
Figure 5D:
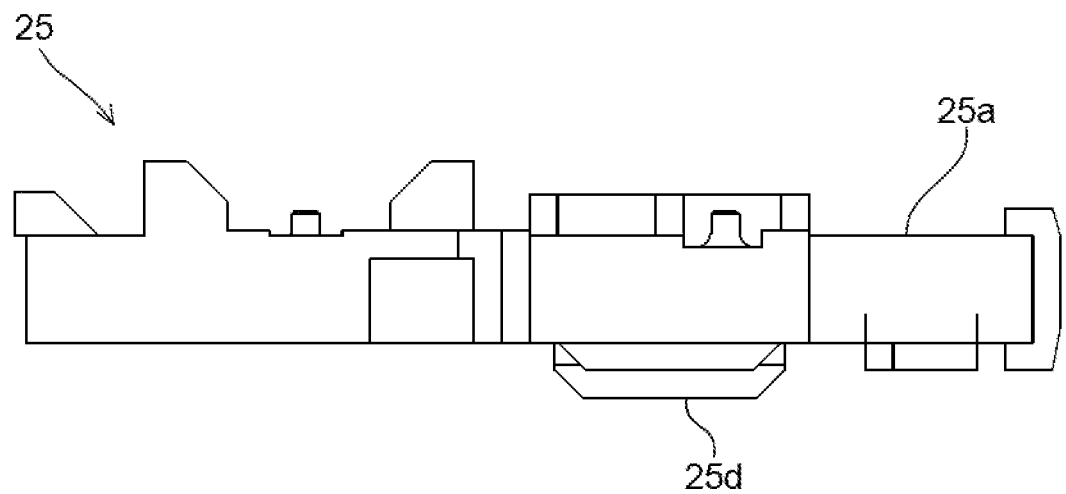
FIG. 5D is a right-side view of a tooth according to the present invention.
Figure 5E:
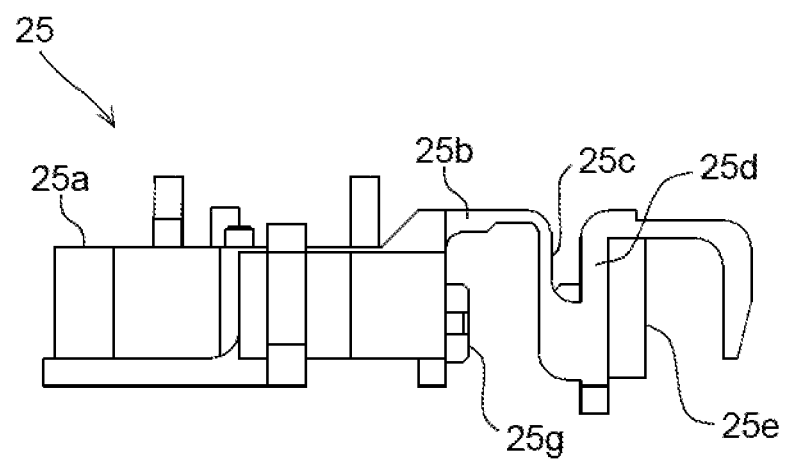
FIG. 5E is a back view of a tooth according to the present invention.

The structure of the tooth 25 will now be described in detail. FIGS. 5A to 5F are six views of the tooth 25, where FIG. 5A is a plan view, FIG. 5B is a front view, FIG. 5C is a left-side view, FIG. 5D is a right-side view, FIG. 5E is a back view, and FIG. 5F is a bottom view.

The tooth 25 comprises a tooth body 25a formed of POM (polyoxymethylene) or the like by injection molding or the like and fixed to the lower surface of the OPU 21 by a screw or the like, a plurality (two in this embodiment) of support pieces 25b, 25b projecting from the tooth body 25a toward the lead screw 24, a plurality (two in this embodiment) of resin spring pieces 25c, 25c having a base part on the projecting end of each of the support pieces 25b, 25b and extending in a direction orthogonal to the axial direction of the lead screw 24, a plate part 25d provided with a base part on the extending ends of the resin spring pieces 25c, 25c and formed in a direction parallel to the axial direction of the lead screw 24, ribbed meshing cogs 25e, 25e formed on the plate part 25d on the side near the lead screw 24, and a linking part 25f formed across the space between the support pieces 25b, 25b and/or the resin spring pieces 25c, 25c (formed between the base parts of the resin spring pieces 25c, 25c on the side near the support pieces 25b, 25b in the present embodiment).

In the present embodiment, the resin spring pieces 25c are thinner than the support pieces 25b. In addition, the linking part 25f has the same thickness as the resin spring pieces 25c, 25c. The width of the linking part 25f in plan view is less than the width of the resin spring pieces 25c, 25c and the support pieces 25b, 25b in plan view, and the width of the resin spring pieces 25c, 25c in plan view is less than the width of the support pieces 25b, 25b in plan view.

Three or more resin spring pieces 25c and support pieces 25b may be provided. Even in this case, at least one linking part 25f should be provided, and one or a plurality of linking parts 25f may each be provided between the resin spring pieces 25c and/or the support pieces 25b. The shape of the linking part 25f is not particularly limited as long as the linking part 25f is shaped so as not to interfere with the tooth spring 32, and the shape can be rectilinear, curved, bent, or the like.

The tooth spring 32 is a coil-shaped compression spring disposed in a space between the resin spring pieces 25c so as to urge the tooth body 25a and the plate part 25d. Specifically, protrusions 25g, 25h are formed facing each other in sections facing the tooth body 25a and the plate part 25d, respectively, and both ends of the tooth spring 32 are fitted to the protrusions 25g, 25h, whereby the tooth spring 32 is supported so as not to fall out.

When the stepper motor 23 is driven in such a configuration, the lead screw 24 is rotated, the driving power is transmitted to the meshing cogs 25e, 25e of the tooth 25, and the tooth 25 and the OPU 21 fixed thereupon are advanced along the guide shafts 22, 22.

Figure 6B:
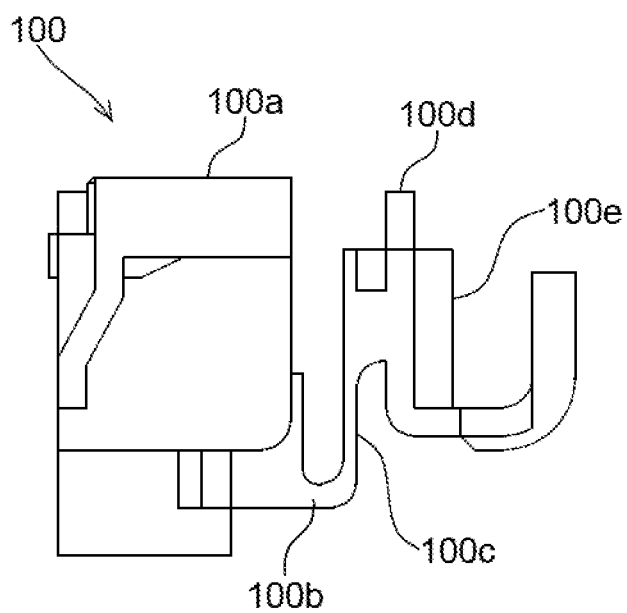
FIG. 6B is a front view of a tooth according to a comparative example.
Figure 6C:
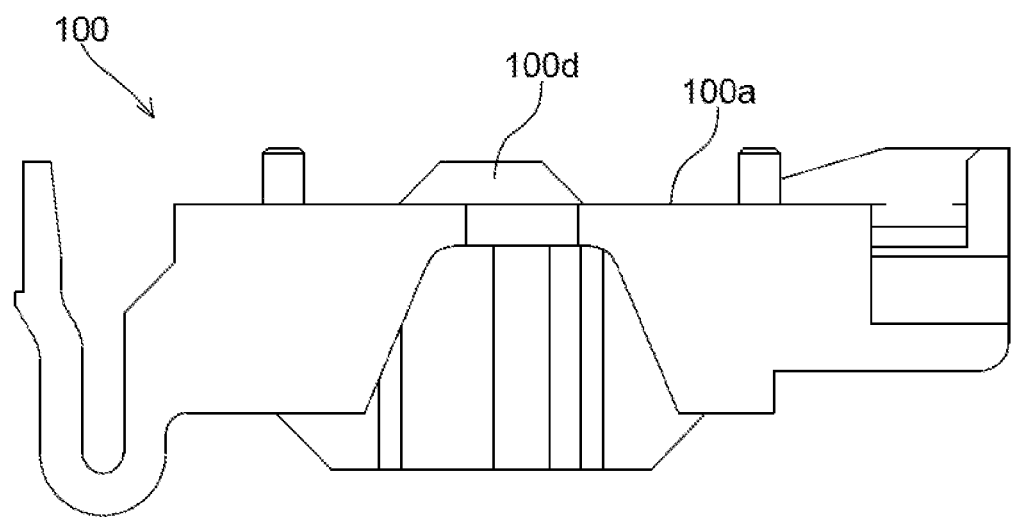
FIG. 6C is a left-side view of a tooth according to a comparative example.
Figure 6D:
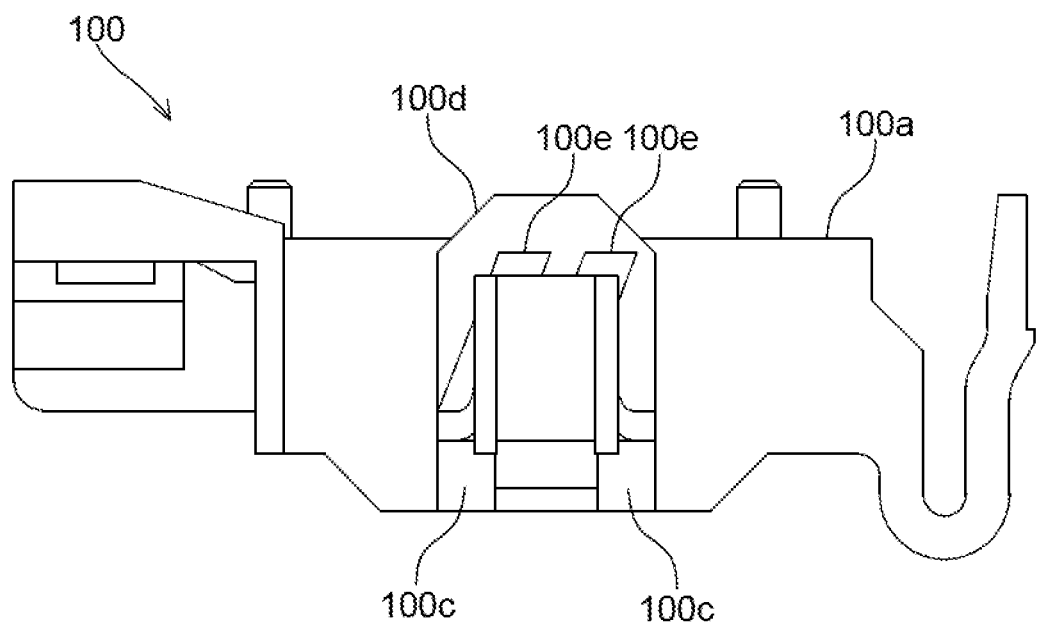
FIG. 6D is a right-side view of a tooth according to a comparative example.
Figure 6E:
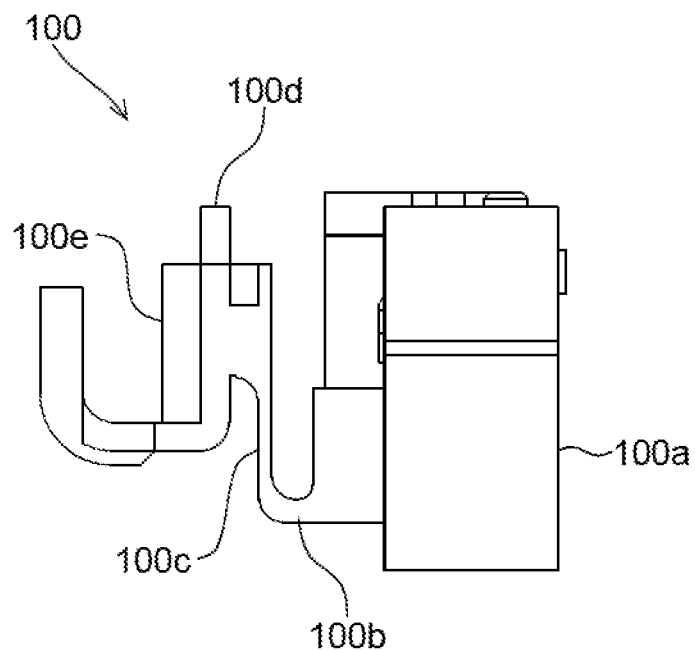
FIG. 6E is a back view of a tooth according to a comparative example.
Figure 6F:
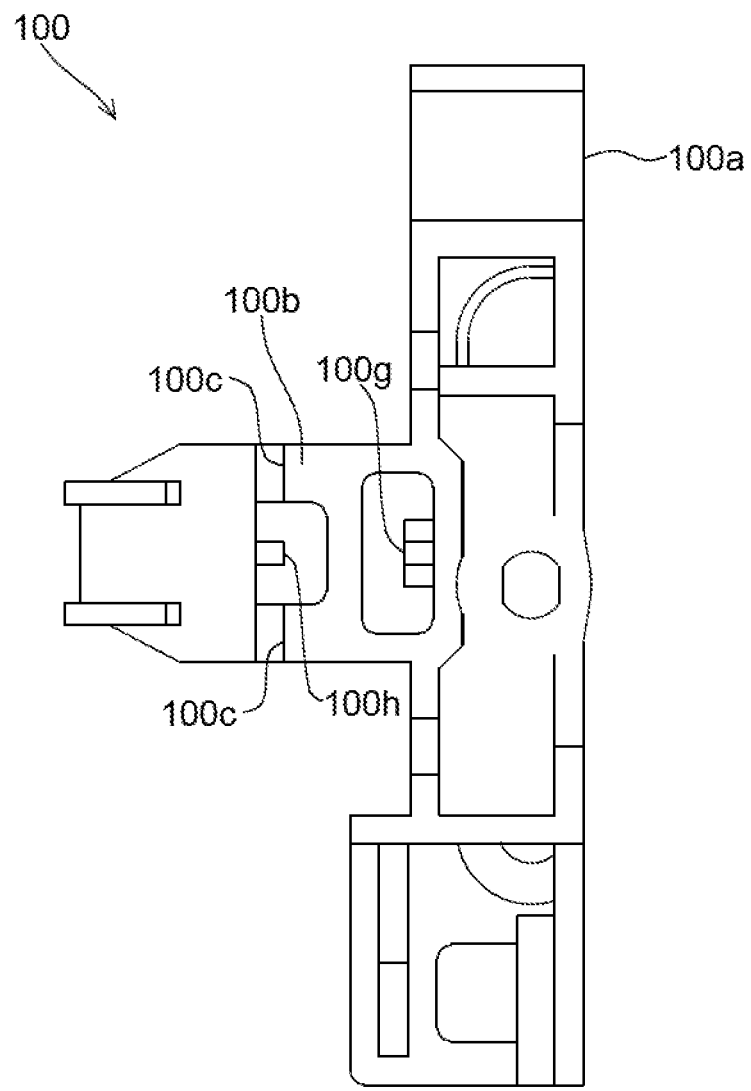
FIG. 6F is a bottom view of a tooth according to a comparative example.

A tooth that is not designed to be made thinner will now be described as a comparative example. FIGS. 6A to 6F are six views of the tooth according to the comparative example, where FIG. 6A is a plan view, FIG. 6B is a front view, FIG. 6C is a left-side view, FIG. 6D is a right-side view, FIG. 6E is a back view, and FIG. 6F is a bottom view.

The tooth 100 comprises a tooth body 100a fixed to the lower surface of an OPU by a screw or the like; two support pieces 100b, 100b projecting from the tooth body 100a toward a lead screw; two resin spring pieces 100c, 100c having a base part on the projecting end of each of the support pieces 100b, 100b and extending in a direction orthogonal to the axial direction of the lead screw; a plate part 100d provided with a base part on the extending ends of the resin spring pieces 100c, 100c and formed in a direction parallel to the axial direction of the lead screw; meshing cogs 100e, 100e formed on the plate part 100d on the side near the lead screw; and protrusions 100g, 100h to which both ends of a tooth spring are fitted, respectively.

A comparison between the tooth 25 of the present invention and the tooth 100 of the comparative example shows that the tooth 25 of the present invention is markedly thinner than the tooth 100 of the comparative example. Accordingly, the resin spring is also shorter. The elastic force is stronger and stiffer with a shorter resin spring. Therefore, the section of the tooth 25 of the present invention that extends toward the lead screw 24 from the base part of the resin spring pieces 25c on the side near the support pieces 25b, 25b is therefore made thinner than in the comparative example in order to adequately weaken the elastic force.

In addition, the support pieces 25b and the resin spring pieces 25c projecting toward the lead screw 24 in the tooth 25 of the present invention are longer than in the comparative example. This ensures adequate displacement of the resin spring and prevents tooth jumping. In designs having the same length as that in the comparative example, the displacement of the resin spring is reduced in proportion to the reduction in thickness, and the lead screw cannot be adequately urged by the tooth spring, bringing about tooth jumping.

In addition, the tooth 25 of the present invention is provided with a linking part 25f, which is absent in the tooth 100 of the comparative example. This enhances the strength of the support pieces 25b, 25b and/or the resin spring pieces 25c, 25c, prevents the support pieces 25b, 25b and/or resin spring pieces 25c, 25c from being broken by stress applied to the tooth 25 when the tooth spring 32 is inserted during assembly, and prevents the support pieces 25b, 25b and/or the resin spring pieces 25c, 25c from being broken by stress applied during jumping of the meshing cogs 25e, 25e. For the support pieces 25b and the resin spring pieces 25c projecting toward the lead screw 24, the probability of breakage increases in proportion to the increase in length when the linking part 25f is absent.

The tooth 25 of the present invention is thus made thinner while meeting the design requirements, making it possible to implement a thin drive device for an optical disc apparatus.

The present invention can be used for an optical disc apparatus for recording on and playing a CD, DVD, BD, or the like. Examples include BD/DVD players, BD/DVD recorders, BD/DVD recorders integrated with a TV, personal computers provided with a BD/DVD recorder/player, and the like.

What is claimed is:

1. A drive device for an optical disc apparatus, comprising:
   an optical pickup;
   a guide shaft for movably supporting the optical pickup;
   a lead screw;
   a resin tooth fixed to the optical pickup, the tooth extending toward the lead screw in a cantilevered state, meshing cogs thereof being in meshed engagement with the lead screw, and the tooth being advanced following the rotation of the lead screw; and
   a tooth spring for urging the meshing cogs in the direction of meshing with the lead screw;
   wherein the tooth comprises a tooth body fixed to the optical pickup, a plurality of support pieces projecting from the tooth body toward the lead screw, a plurality of resin spring pieces having a base part on the projecting end of each of the support pieces and extending in a direction orthogonal to the axial direction of the lead screw, a plate part provided with a base part on the extending ends of the resin spring pieces and formed in a direction parallel to the axial direction of the lead screw, meshing cogs formed on the plate part on the side near the lead screw, and a linking part formed across the space between the support pieces and/or the resin spring pieces; and
   wherein the tooth spring is disposed so as to urge the tooth body and the plate part in a space between the resin spring pieces.

2. The drive device for an optical disc apparatus according to claim 1, wherein two resin spring pieces are provided, and the linking part links the base parts of the resin spring pieces on the side near the support pieces.

3. The drive device for an optical disc apparatus according to claim 2, wherein the linking part has the same thickness as the resin spring pieces.

* * * * *